(12) United States Patent
Narasimhan et al.

(10) Patent No.: US 8,810,532 B2
(45) Date of Patent: Aug. 19, 2014

(54) IN-SITU DETECTION OF TOUCHSCREEN PANEL SHORTS

(75) Inventors: Sarangan Narasimhan, San Jose, CA (US); Mercedes E. Gil, Fort Collins, CO (US)

(73) Assignee: Pixart Imaging, Inc., Hsin-Chu (TW)

( * ) Notice: Subject to any disclaimer, the term of this patent is extended or adjusted under 35 U.S.C. 154(b) by 529 days.

(21) Appl. No.: 13/092,642

(22) Filed: Apr. 22, 2011

(65) Prior Publication Data

US 2012/0268413 A1   Oct. 25, 2012

(51) Int. Cl.
*G06F 3/041* (2006.01)
*G06F 3/044* (2006.01)

(52) U.S. Cl.
CPC .... G06F 3/0418 (2013.01); *G06F 2203/04103* (2013.01); G06F 3/044 (2013.01)
USPC ............................. 345/173; 324/512; 324/519

(58) Field of Classification Search
USPC ........................................................ 345/174
See application file for complete search history.

(56) References Cited

U.S. PATENT DOCUMENTS

| | | | |
|---|---|---|---|
| 5,335,230 A * | 8/1994 | Crooks et al. | 714/48 |
| 5,543,588 A | 8/1996 | Bisset et al. | |
| 6,977,646 B1 * | 12/2005 | Hauck et al. | 345/173 |
| 7,138,805 B2 * | 11/2006 | Ishioka et al. | 324/658 |
| 7,639,238 B2 * | 12/2009 | Hauck | 345/173 |
| 2002/0196031 A1 * | 12/2002 | Blades | 324/536 |
| 2007/0200831 A1 * | 8/2007 | Wang | 345/173 |
| 2008/0006453 A1 | 1/2008 | Hotelling | |
| 2008/0278453 A1 * | 11/2008 | Reynolds et al. | 345/173 |
| 2008/0297174 A1 | 12/2008 | Narasimhan et al. | |
| 2009/0025987 A1 * | 1/2009 | Perski et al. | 178/18.03 |
| 2009/0250268 A1 * | 10/2009 | Staton et al. | 178/18.06 |
| 2010/0060608 A1 | 3/2010 | Yousefpor | |
| 2010/0302201 A1 | 12/2010 | Ritter et al. | |
| 2011/0050617 A1 | 3/2011 | Murphy et al. | |
| 2011/0050620 A1 * | 3/2011 | Hristov | 345/174 |
| 2011/0140720 A1 * | 6/2011 | Kurashima | 324/686 |
| 2012/0188195 A1 * | 7/2012 | Fang | 345/174 |
| 2012/0293455 A1 * | 11/2012 | Shen et al. | 345/174 |

\* cited by examiner

*Primary Examiner* — Dorothy Harris
(74) *Attorney, Agent, or Firm* — McClure, Qualey & Rodack, LLP

(57) ABSTRACT

A test system for testing a capacitive-sense touchscreen is disclosed. Specifically, the test system may be incorporated within a controller that is also used to control operations of the touchscreen. The controller may include an Integrated Circuit and the test system may correspond to a test capacitor embedded into the Integrated Circuit.

14 Claims, 7 Drawing Sheets

IN-SITU DETECTION OF TOUCHSCREEN PANEL SHORTS

FIELD OF THE DISCLOSURE

The present disclosure is generally directed toward input devices and more specifically directed toward mechanisms for testing touchscreen devices.

BACKGROUND

Capacitive-sense touchscreens have become widely available as a user interface component of user devices. In particular, touchscreens have become extremely popular in mobile phones, cellular phones, tablets, Personal Digital Assistants (PDAs), laptops, and other portable computing devices. Touchscreens are also widely employed in Point Of Sale (POS) terminals, inventory management systems, security systems, and the like.

One reason for the increased popularity of touchscreens and specifically capacitive-sense touchscreens in user devices is their ability to simultaneously act as a user input device and a user output device. More particularly, touchscreens enable a user to interact with the data that is presented to the user rather than interact with a set of separate buttons. This helps minimize the size of the user device and/or maximize the size of the output screen used to present information to the user. In other words, capacitive-sense touchscreens can be utilized as an intuitive method of obtaining input for user devices.

Two principal capacitive sensing and measurement technologies are currently employed in most capacitive touchscreen devices. The first such technology is that of self-capacitance. Many devices manufactured by SYNAPTICS™ employ self-capacitance measurement techniques, as do Integrated Circuit (IC) devices such as the CYPRESS PSOC™. Self-capacitance involves measuring the self-capacitance of a series of electrode pads using techniques such as those described in U.S. Pat. No. 5,543,588 to Bisset et al. and U.S. Patent Publication Nos. 2010/0302201 to Ritter et al. and 2008/0297174 to Narasimhan et al., each of which are hereby incorporated herein by reference in their entirety.

Self-capacitance may be measured through the detection of the amount of charge accumulated on an object held at a given voltage ($Q=CV$). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors employed in touchscreens are configured such that the grounded object is a finger. The human body is essentially a capacitor to a surface where the electrical field vanishes, and typically has a capacitance of around 100 pF.

Electrodes in self-capacitance touchscreens and/or touchpads are typically arranged in rows and columns. By scanning first rows and then columns the locations of individual disturbances induced by the presence of a finger, for example, can be determined.

Typically, rows and columns of electrodes in self-capacitance sensing devices such as touchscreens or touchpads comprise electrically conductive traces or strips of Indium Tin Oxide (ITO) laid down on a glass or plastic substrate. Although ITO is the material of choice in most capacitive-sense touchscreens, other known materials or compositions which are functionally equivalent to ITO may also be used.

During and after the process of forming such traces on a suitable substrate, defects in such traces or strips will arise, at least in some of the self-capacitance sensing devices. It is desirable to minimize the number of defects in a batch of sensing devices (e.g., increase the yield rate), but it is difficult if not impossible to completely eliminate the occurrence of faults in the touchscreens. Common defects in ITO traces in touchscreens include shorting between traces, shorting between one or more traces and ground, broken traces, traces that are too thin, too narrow, too thick or too wide, unintended irregularities in the geometries of individual traces, and the like.

Defects in ITO traces can significantly negatively impact the performance of a touchscreen or touchpad. Because of this fact, testing is often carried out on individual self-capacitance sensing devices after the manufacturing process has been completed. Once such testing method for self-capacitance touch sensing devices is described in U.S. Patent Publication No. 2008/0278453 to Reynolds et al., the entire contents of which are hereby incorporated herein by reference. There are several problems with testing the integrity of ITO or other types of electrodes in a self-capacitance sensing device; however, testing is still an important production step to ensure product quality.

The second primary capacitive sensing and measurement technology employed in capacitive touch sensing devices is that of mutual capacitance, where measurements are typically performed using a crossed grid of electrodes. See, for example, U.S. Pat. No. 5,861,875 to Gerpheide, the entire contents of which are hereby incorporated herein by reference. In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems.

A current problem with testing touchscreen devices or touchpads, regardless of whether or not they utilize mutual capacitance technologies or self-capacitance technologies, is that separate testing equipment is required to perform the tests. In particular, an external stimulus has to be applied to the drive and sense columns to test whether a fault exists. Application of the external stimulus often requires the need for additional test circuitry in the facility which is manufacturing the touchscreens or touchpads. This implies additional costs to touchscreen manufacturers. It would be desirable to minimize or eliminate these additional costs.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Furthermore, although embodiments will primarily be described in connection with testing capacitive-sense touchscreens or touchpads, those of ordinary skill in the art will appreciate that the embodiments described herein may be applied beyond the field of touchscreens. In particular, any device which utilizes capacitive properties and which requires a controller may benefit from the present disclosure.

Figure 1:
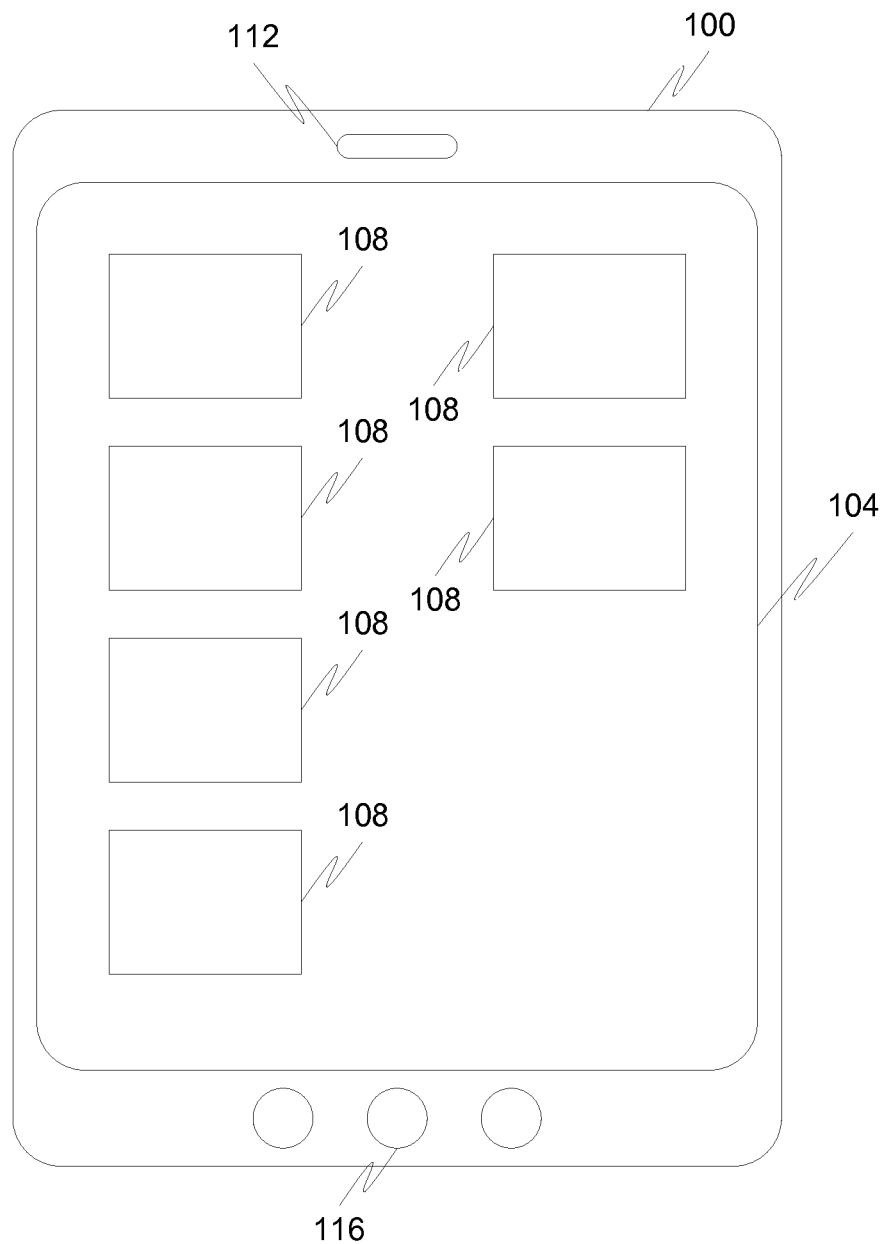
FIG. 1 is a block diagram depicting user interface components of a user device in accordance with embodiments of the present disclosure.

Referring initially to FIG. 1, a user device 100 is depicted in accordance with at least some embodiments of the present disclosure. The user device 100 may correspond to any type of user device whether mobile or immobile. Examples of a suitable user device 100 include, without limitation, a mobile phone, cellular phone, smart phone, telephone, tablet, netbook, laptop, Personal Computer (PC), thin client, POS terminal, portable media player, radio, television, exercise machine, household appliance, industrial control device, Mobile Internet Device (MID), Global Positioning System (GPS) device, and the like.

The user device 100 may be used by one or multiple users. To facilitate user interaction with the user device 100, the user device 100 may comprise a combination user input/output device in the form of a touchscreen 104, one or more dedicated user output devices 112, and one or more dedicated user input devices 116. It should be appreciated that the touchscreen 104 may include a touchpad or any other type of device capable of simultaneously presenting information to a user and receiving input from a user. In some embodiments, the touchscreen 104 can be used as a mechanism for presenting one or more User Interface (UI) objects 108 to the user. In some embodiments, the UI objects 108 may correspond to an icon, window, link, text, picture, video, or any other visual representation of data on a screen prepared by a processor.

The user may be allowed to place an object (e.g., their finger, a pen, a stylus, or the like) in contact with or just within proximity of the touchscreen 104 and the touchscreen 104 may be configured to detect the location of the object relative to the UI objects 108. Depending upon the location of the detected user input, the user device 100 may perform one or more actions consistent with the user input.

The dedicated user output device 112 may include one or more of a speaker, light source (e.g., Light Emitting Diode (LED), collection of LEDs, array of LEDs), Liquid Crystal Display (LCD) device, and the like.

The dedicated user input device 116 may include one or more of a microphone, key, button, physical switch, and the like.

Figure 2:
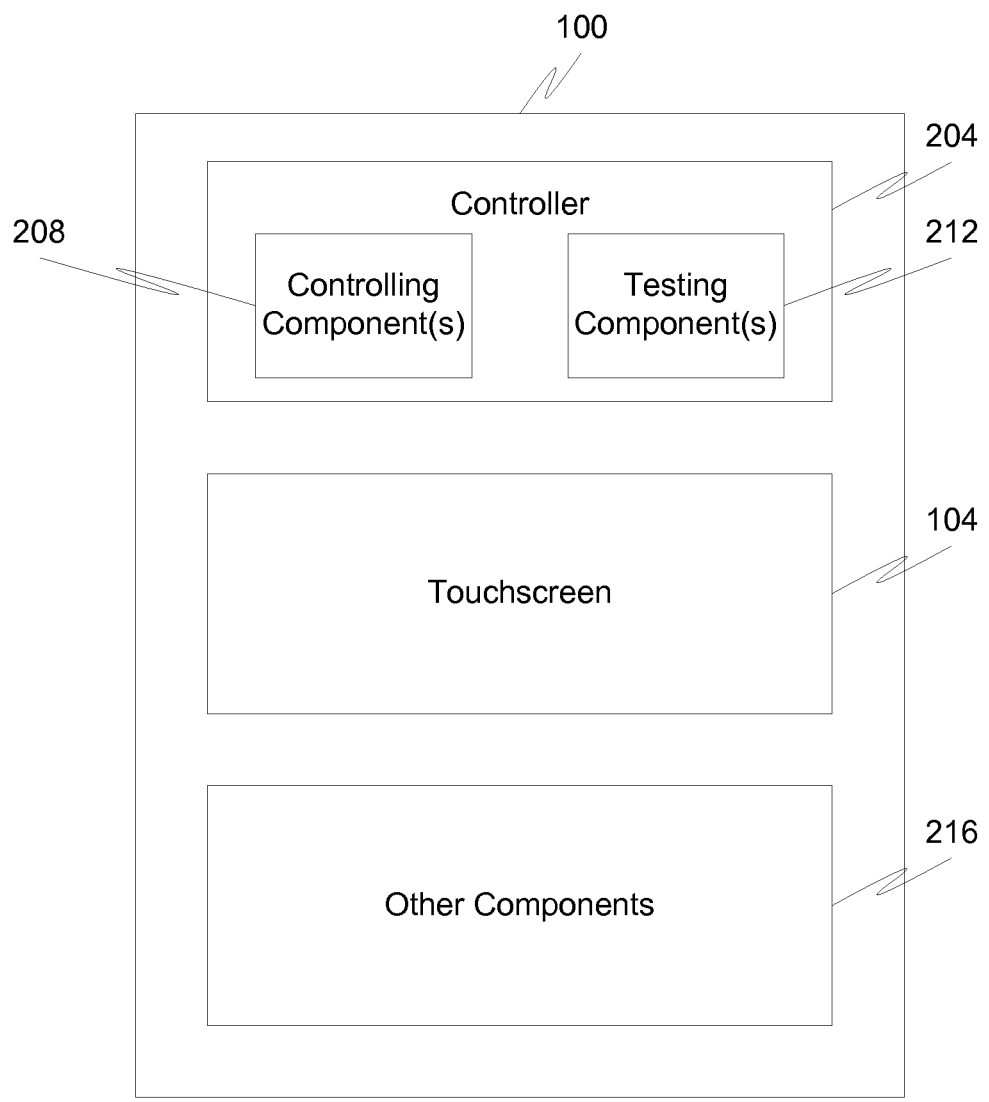
FIG. 2 is a block diagram depicting components of a user device in accordance with embodiments of the present disclosure.

Referring now to FIG. 2, at least some internal components of the user device 100 are depicted in accordance with at least some embodiments of the present disclosure. In some embodiments, the user device 100 may include a controller 204 configured to control operations of the touchscreen 104 as well as other components 216. The other components 216 may comprise the electrical hardware, software, and/or firmware natively provided on the user device 100. As can be appreciated, the nature of the other components 216 may depend upon the type of user device 100 employing the touchscreen 104. Some examples of other components 216 that may be included in the user device 100 include, without limitation, processors, memory, circuits and circuit components, Application Specific Integrated Circuits (ASICs), IC chips, antennas, communication interfaces, Input/Output (I/O) ports, modems, and the like.

In some embodiments, the controller 204 for the touchscreen 104 natively includes both controlling components 208 and testing components 212. More specifically, the touchscreen 104 may have components integrated therein that allow the controller 204 to detect and process user inputs received at the touchscreen 104 as well as test the touchscreen 104 during various manufacturing stages. It is also possible that the testing components 212 can be used to test the touchscreen 104 for faults while the touchscreen 104 is being manufactured, after the touchscreen 104 has been manufactured but before it has been incorporated into the user device 100, after the touchscreen 104 has been incorporated into the user device 100, and/or after the user device 100 has been completely manufactured. In other words, the controller 204 may have controlling components 208 and testing components 212 integrated therein and the testing components may provide an in-situ mechanism for detecting faults in the touchscreen 104 at various production stages.

Integration of testing components 212 into the controller 204 provides a significant advantage over traditional touchscreen controllers, which relied upon external testing components to test the fidelity of the touchscreen 104. In particular, prior art touchscreens would first have to be connected to their controller and then would have to be tested with external testing components. By providing the testing components 212 in the controller 204, embodiments of the present disclosure can provide a complete controller solution 204 to touchscreen manufacturers.

Figure 3:
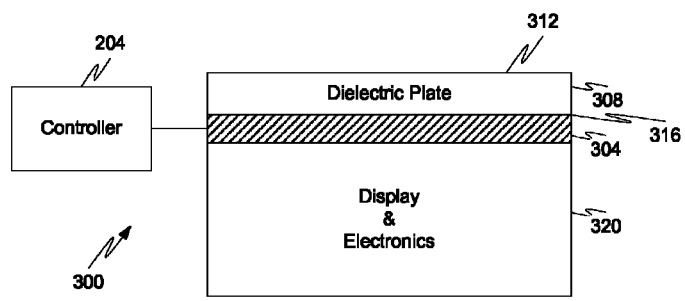
FIG. 3 is a cross-sectional view of a capacitive touchscreen system in accordance with embodiments of the present disclosure.

FIG. 3 depicts a capacitive touchscreen system 300 in accordance with embodiments of the present disclosure. In some embodiments, the touchscreen system 300 comprises an underlying LCD or OLED display 320, an overlying touch-sensitive panel 304, a protective cover or dielectric plate 308 disposed over the touch-sensitive panel 304, and a touchscreen controller, micro-processor, application specific integrated circuit ("ASIC") or CPU 204.

In some embodiments, the dielectric plate 308 interfaces with the touch-sensitive panel 304 at a bottom major surface of the dielectric plate 316. The opposing surface of the dielectric plate 316 corresponds to a top major surface 312. The top major surface of the dielectric plate 316 represents the surface of the touchscreen 104 with which a user interacts (e.g., touches).

Figure 4:
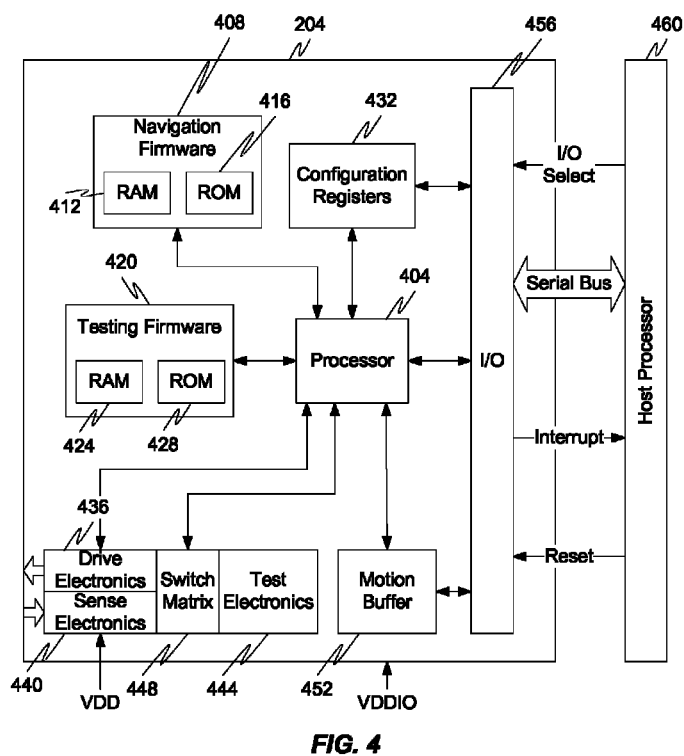
FIG. 4 is a block diagram depicting details of a touchscreen controller in accordance with embodiments of the present disclosure.

FIG. 4 is a block diagram depicting further details of a controller 204 which may be used to control operations of the touchscreen 104 and/or test the touchscreen 104 for faults. In some embodiments, the controller 204 is a low-power capacitive touch-panel controller designed to provide a touchscreen system with high-accuracy, on-screen navigation. Capacitive touch-sensitive panels 304 can be formed by applying a conductive material such as ITO to the surface(s) of a dielectric plate, which typically comprises glass, plastic or another suitable electrically insulative and preferably optically transmissive material, and which is usually configured in the shape of an electrode grid.

The capacitance of the grid holds an electrical charge, and touching the panel at the top major surface 312 with a finger (or other type of object) presents a circuit path to the user's body, which creates a disruption. The touchscreen controller 204 utilizes the controlling components 208 to sense and analyze the coordinates of these disruptions. In some embodiments, the coordinates of the disruptions may be compared to a location of a UI object 108. When the touchscreen 104 is affixed to a display with a graphical user interface, on-screen navigation is possible by tracking the touch coordinates. Often it is necessary to detect multiple touches. The size of the grid is driven by the desired resolution of the touches. Typically there is an additional dielectric plate 308 to protect the top ITO layer of touchscreen 104 to form a complete touch screen solution.

One way to create a touch-sensitive panel 304 is to apply an ITO grid on one side only of a dielectric plate or substrate. When the touch-sensitive panel 304 is mated with a display there is no need for an additional protective cover. This has the benefit of creating a thinner display system with improved transmissivity (>90%), enabling brighter and lighter handheld devices.

In accordance with at least some embodiments of the present disclosure, the controller 204 comprises a processor 404, navigation firmware 408 including instructions stored in one or more forms of Random Access Memory (RAM) 412 and/or Read Only Memory (ROM) 416, testing firmware 420 including instructions stored in one or more forms of RAM 424 and/or ROM 428, configuration registers 432, drive electronics 436, sense electronics 440, test electronics 444, switch matrix 448, motion buffer 452, and one or more I/O ports 456 for enabling the controller 204 to interface with an external host processor 460 of the user device 100. In some embodiments, the controller 204 may receive power inputs for its components at a voltage of VDD and the I/O ports 456 may receive an input voltage of VDDIO. One of ordinary skill in the art will appreciate that other forms of power supplies may be provided to the controller 204 and the magnitude of voltage provided at VDD and VDDIO may vary according to the size of components included in the controller 204.

In some embodiments, one or more of the processor 404, navigation firmware 408, drive electronics 436, and sense electronics 440 may be considered part of the controlling components 208. The controller 204 may exert control over the touchscreen 104 by utilizing the processor 404 to read various instructions from the navigation firmware 408. The processor 404 may then cause the drive electronics 436 to apply a particular voltage to drive lines in the touch-sensitive panel 304. User inputs may be detected by the sense electronics 440 as changes in the capacitance at one or more sense lines in the touch-sensitive panel 304. These changes in capacitance may be reported to the processor 404 where they are converted to user input data which is subsequently provided to the host processor 460 via the I/O ports 456.

In some embodiments, one or more of the processor 404, testing firmware 420, drive electronics 436, sense electronics 440, switch matrix 448, and test electronics 444 may be considered part of the testing components 212. Specifically, the processor 404 may implement a testing process as described in the testing firmware 420 by systematically controlling the switch matrix 448. As the processor 404 controls the switch matrix 448, the test electronics 444 may be connected between various parts of the drive electronics 436 and various parts of the sense electronics 440. Depending upon the testing routine defined in the testing firmware 420, the processor 404 may cause the test electronics 444 to be systematically connected between each drive line/sense line pair until all possible drive line/sense line pairs have been tested. In other embodiments, the test electronics 444 may be connected across multiple drive and/or sense lines in accordance with any testing procedure currently known in the art. As one example, the processor 404 may control the switch matrix 448 to implement testing procedures such as those described in U.S. Patent Publication No. 2009/0250268 to Staton et al., the entire contents of which are hereby incorporated herein by reference.

Figure 5:
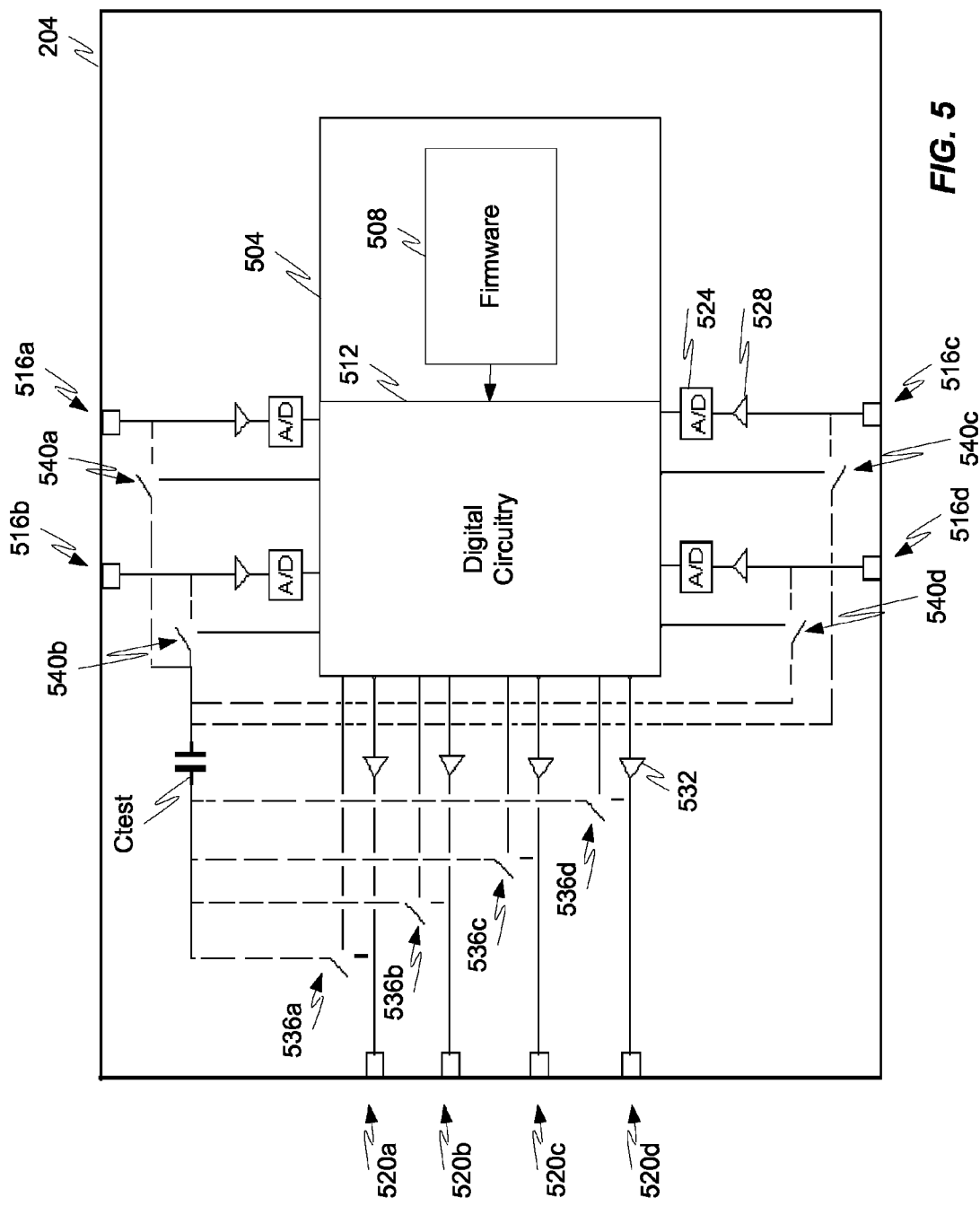
FIG. 5 is a circuit diagram depicting details of a touchscreen controller in accordance with embodiments of the present disclosure.

FIG. 5 depicts one possible implementation of the drive electronics 436, sense electronics 440, switch matrix 448, and test electronics 444 in accordance with at least some embodiments of the present disclosure. The controller 204 depicted in FIG. 5 represents an IC chip configured for controlling and/or testing a 4×4 touchscreen panel. As can be appreciated, a controller may be configured to control and/or test a touchscreen panel having a greater or lesser number of drive and sense lines (e.g., 1×1, 1×2, 2×2, . . . , 16×16, 32×32, etc.) without departing from the scope of the present disclosure. Furthermore, those skilled in the art will understand that touchscreen controllers, micro-processors, ASICs or CPUs other than an controller 204 described herein may be employed in touchscreen system 300, and that different numbers of drive and sense lines, and different numbers and configurations of drive and sense electrodes, other than those explicitly shown herein may be employed without departing from the scope or spirit of the various embodiments of the disclosure.

In particular, the controller 204 may comprise circuit control components 504 which include instructions for controlling the circuitry in the form of firmware 508 as well as digital circuitry 512 for implementing the instructions. In some embodiments, the firmware 508 may include one or both of the navigation firmware 408 and testing firmware 420. The digital circuitry 512 may comprise one or more digital circuit components such as a plurality of logic gates that can be used to create combinational logic. Each logic gate represents a function of Boolean logic. A logic gate is an arrangement of electrically controlled switches, better known as transistors. Alternatively, or in addition, the digital circuitry 512 may comprise one or more lookup tables, possibly in the form of a Programmable Logic Device (PLD), which may be configured to perform the functions defined in the firmware 508. Still further in the alternative, or additionally, a Programmable Logic Circuit (PLC) may be provided as an embedded system in the controller 204. Other forms of known digital circuitry 512 may also be used in accordance with embodiments of the present disclosure.

The drive electronics 436 may be embodied as one or more drive lines 520a-d connected to the digital circuitry 512 via one or more driver amplifiers 532.

The sense electronics 440 may be embodied as one or more sense lines 516a-d connected to the digital circuitry via one or more amplifiers 528 and one or more Analog-to-Digital Converters (A/D) 524.

The test electronics 444 may be embodied as a test capacitor Ctest which can be selectively coupled and uncoupled to the drive lines 520a-d via a series of drive line switches 536a-d. The test capacitor Ctest may also be selectively coupled and uncoupled to the sense lines 516a-d via a series of sense line switches 540a-d. Control over the drive line switches 536a-d and sense line switches 540a-d may be exerted by the circuit control components 540 when implementing the testing routines defined in the testing firmware 420.

In accordance with at least some embodiments of the present disclosure, each drive line 520a-d may be systematically connected to each sense line 516a-d and vice versa during a testing routine by selectively closing and opening certain pairs of drive line switches 536a-d and sense line switches 540a-d. As an example, the test capacitor Ctest may be connected between the third sense line 516c and the second drive line 520b by closing the third sense line switch 540c, closing the second drive line switch 536b, and opening all other drive and sense line switches. This causes the capacitance applied across the third sense line 516c and the second drive line 520b to be increased by the value of test capacitor Ctest.

In some embodiments, the test capacitor Ctest comprises a relatively large capacitance as compared to the capacitance which is normally induced between the drive and sense lines when the drive line is charged. Specifically, during normal operations, the drive lines 520a-d may be charged and a capacitance between each drive line 520a-d and each sense line 516a-d may be on the order of about 1-2 pF. In accordance with at least some embodiments of the present disclosure, the test capacitor Ctest may comprise a capacitance that is at least twice as large and possibly three times as large as any mutual capacitance created between an electrode in the drive lines 520a-d and an electrode in the sense lines 516a-d. More specifically, the test capacitor Ctest may have a capacitance of about 4.5 pF when mutual capacitances of about 1-2 pF are expected for a properly functioning touchscreen 104.

As can be appreciated by those of ordinary skill in the art, the test capacitor Ctest may be provided as a single capacitor or a plurality of capacitors having an equivalent capacitance sufficient to test the touchscreen 104 or components thereof. Furthermore, where the test capacitor Ctest is provided as a plurality of capacitors, some of the capacitors may be included within the controller 204 whereas others of the capacitors may be external to the controller 204 by capable of being connected to the switch matrix 448. Alternatively, the plurality of capacitors may all be incorporated within the controller 204.

Figure 6:
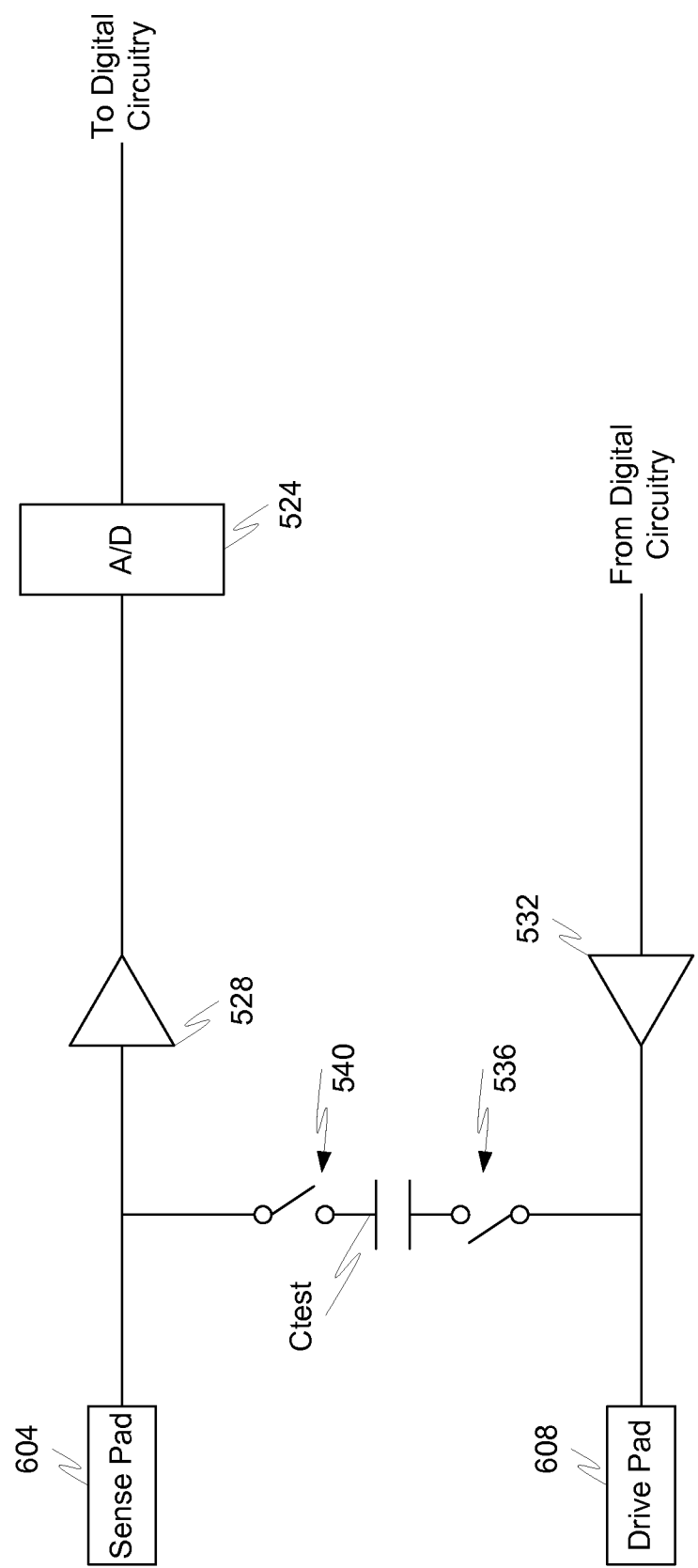
FIG. 6 is a simplified circuit diagram depicting a touchscreen test circuit in accordance with embodiments of the present disclosure.

FIG. 6 depicts a simplified circuit diagram when the test capacitor Ctest is connected across one drive line (e.g., first drive line 520a) and one sense line (e.g., first sense line 516a).

Each sense line 516a-d may comprise a corresponding sense pad 604. Likewise, each drive line 520a-d may comprise a corresponding drive pad 608. The sense pads 604 and drive pads 608 are used to connect the controller 204 to the various electrodes in the touch-sensitive panel 304. Accordingly, electrical signals are provided from the controller 204 to the touch-sensitive panel 304 via the drive pads 608 and electrical signals are received at the controller 204 from the touch-sensitive panel 304 via the sense pads 604.

As discussed above, a drive line and sense line may be connected to each other across the test capacitor Ctest by closing one of the drive line switches 536 and one of the sense line switches 540. When one drive line switch 536 and one sense line switch 540 is closed, the corresponding drive and sense lines are connected in parallel across the test capacitor Ctest and the capacitance of the test capacitor Ctest can be detected across the corresponding drive and sense lines by the digital circuitry 512. The detected capacitance can be used to determine whether the touchscreen 104 and specifically the touch-sensitive panel 304 comprises any faults in a sense line, a drive line, between sense lines, between drive lines, and/or between a drive/sense line pair. Accordingly, faulty touch-sensitive panels 304 can be detected early in the manufacturing process by the controller 204 which will eventually be used to control operations of the touchscreen 104 in the user device 100.

With reference now to FIGS. 7A-D, a 4×4 array of drive and sense lines in a touch-sensitive panel 304 and methods for testing the same will be described in accordance with embodiments of the present disclosure. As can be appreciated, the concepts described in connection with the 4×4 array may be utilized in larger or smaller arrays without departing from the scope of the present disclosure.

In a mutual-capacitance touchscreen environment, one dimension of the array (e.g., the columns) are driven with a clock signal by the touchscreen controller 204. In the depicted example, the columns correspond to the drive lines 520a-d (e.g., col/drive 0=first drive line 520a, col/drive 1=second drive line 520b, col/drive 2=third drive line 520c, and col/drive 3=fourth drive line 520d). In some embodiments, the drive clock may correspond to an operational frequency of a clock in the controller 204, which may operate anywhere between about 100 to about 200 kHz.

Figure 7A:
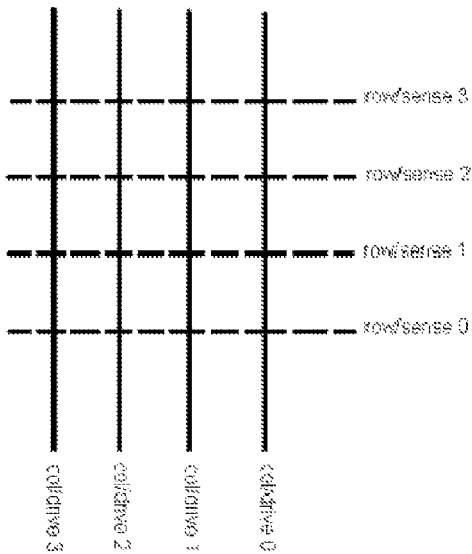
FIG. 7A is a schematic diagram depicting a 4×4 set of drive and sense lines in accordance with embodiments of the present disclosure.
Figure 7B:
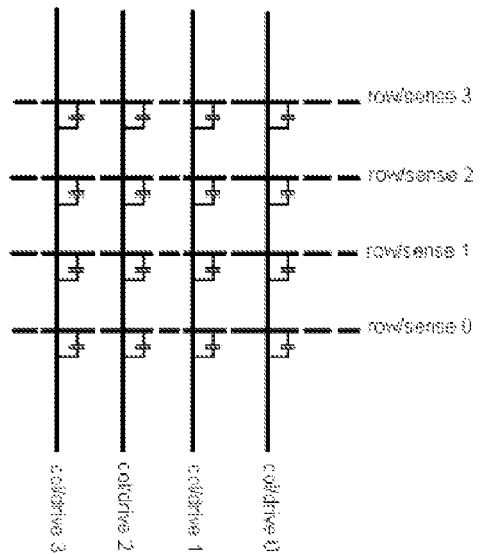
FIG. 7B is a schematic diagram depicting an electrical representation of the 4×4 set of drive and sense lines depicted in FIG. 7A.

The other dimension of the array (e.g., the rows) act as the sense lines 516a-d (e.g., row/sense 0=first sense line 516a, row/sense 1=second sense line 516b, row/sense 2=third sense line 516c, and row/sense 3=fourth sense line 516d). These sense lines will have charge induced via mutual capacitance between the drive line and the sense lines. This charge is measured and digitized at the controller 204. FIG. 7A depicts a 4×4 array of drive lines and sense lines without any faults therein. FIG. 7B depicts an idealized electrical representation showing the mutual capacitance which is produced between each drive and sense line pair.

In accordance with at least some embodiments, a touch-sensitive panel 304 can be tested for faults by introducing the test capacitor Ctest between a single drive and sense line and then actuating that drive line. It is expected that the results from the sense line with the extra capacitance would be larger than the capacitance detected across all other sense lines. If there is a short between two sense lines, then both sense lines would show the effect of the increased capacitance introduced by the test capacitor Ctest. Similarly, if actuating a second drive line showed the effect of the increased capacitance, it could be concluded that there was a short between the drive line purposefully connected to the test capacitor Ctest and another drive line which also showed the effect of the increased capacitance.

Figure 7C:
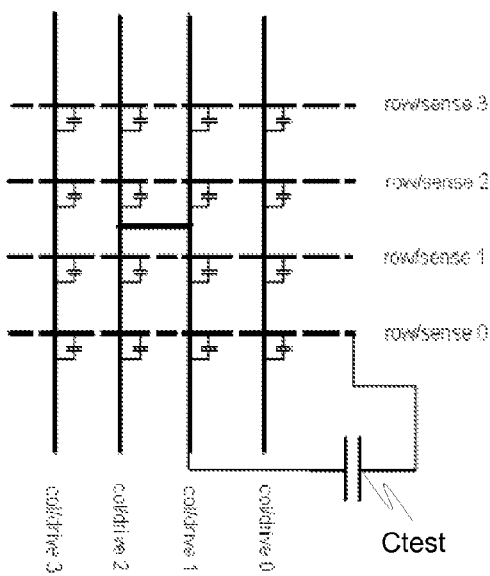
FIG. 7C is a schematic diagram depicting an electrical representation of the 4×4 set of drive and sense lines depicted in FIG. 7A with a first fault.

As example of a fault manifested as a short between two drive lines (e.g., col/drive 1 and col/drive 2) is depicted in FIG. 7C in accordance with embodiments of the present disclosure. The fault may be detected by connecting the test capacitor Ctest to col/drive 1 and row/sense 0. When col/drive line 0 is driven with the drive clock, only the intrinsic panel drive-to-sense capacitance will be detected at each measured sense line. However, when col/drive line 1 is driven with the drive clock, an extra capacitance will be measured on row/sense 0. If the touch-sensitive panel 304 did not have any shorts, then driving col/drive line 2 should again only show the intrinsic drive-to-sense capacitance on all sense lines. However, in the scenario depicted in FIG. 7C, an additional capacitance (due to test capacitor Ctest) will again be detected on row/sense 0. Detection of this additional capacitance can help determine that a fault is present in the touch-sensitive panel 304.

Figure 7D:
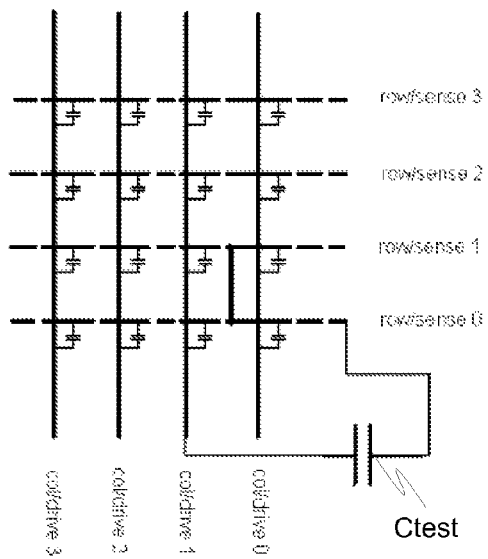
FIG. 7D is a schematic diagram depicting an electrical representation of the 4×4 set of drive and sense lines depicted in FIG. 7A with a second fault.

Another example of a fault is depicted in FIG. 7D in accordance with embodiments of the present disclosure. The fault depicted in FIG. 7D is a short between two sense lines (e.g., row/sense 0 and row/sense 1). Detection of this fault can be achieved when the test capacitor Ctest is connected between col/drive 1 and row/sense 0. Specifically, when col/drive 0 is driven, measurements of both row/sense 0 and row/sense 1 will show the effects of the larger test capacitor Ctest, thereby indicating that a short exists between row/sense 0 and row/sense 1.

Figure 8:
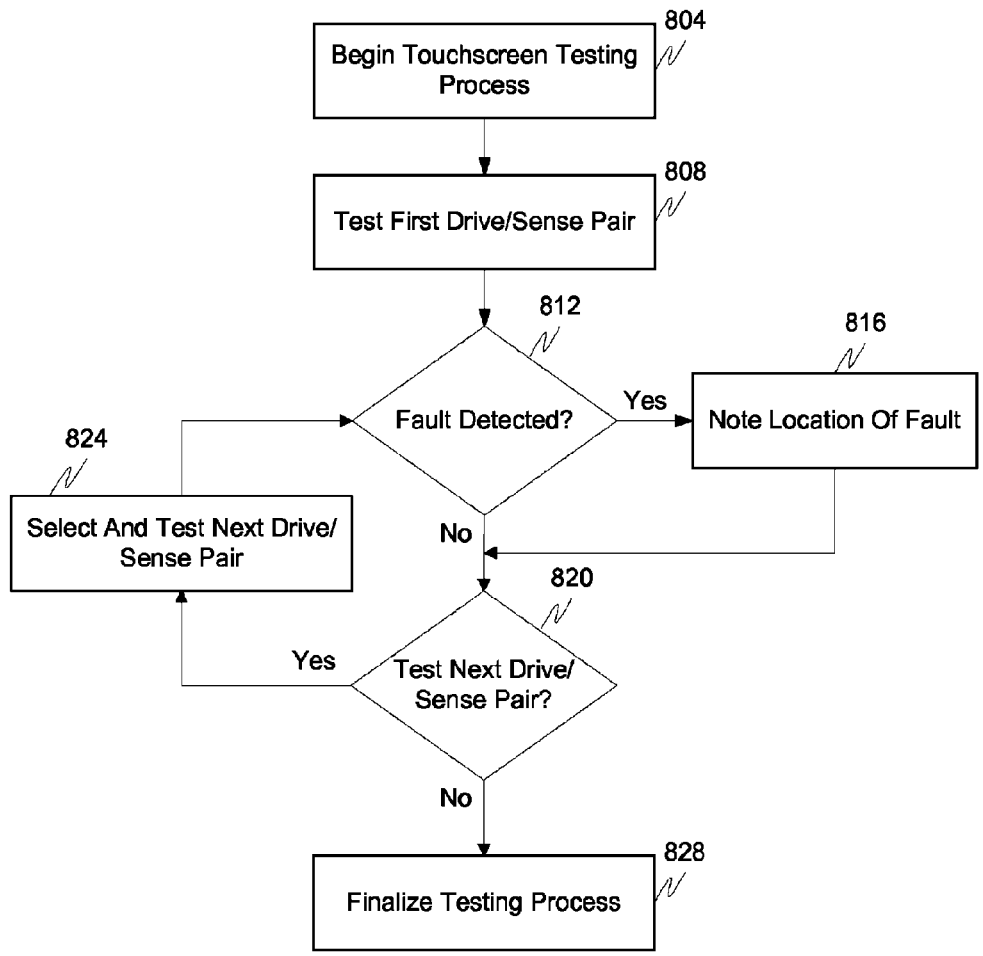
FIG. 8 is a flow diagram depicting a touchscreen testing process in accordance with embodiments of the present disclosure.

With reference now to FIG. 8, a process for testing a touchscreen 104 and/or a touch-sensitive panel 304 for faults will be described in accordance with embodiments of the present disclosure. The process begins when it is determined that a testing procedure is to begin (step 804). This determination may be made by a manufacturer of the touch-sensitive panel 304, a manufacturer of the touchscreen 104, a manufacturer of the user device 100, a distributor of the user device 100, and/or a consumer of the user device 100. Advantageously, the same controller 204 used to control the operation of the touchscreen 104 may be used to test the touchscreen for faults at any point in the chain of distribution. Accordingly, invocation of the testing process may only require that the tester invoke the testing components 212 integrated within the controller 204.

The process continues by testing a first drive/sense pair (step 808). In this step, the test capacitor Ctest may be connected between a first selected drive line and a first selected sense line. This step may also comprise driving the first selected drive line and measuring the capacitance at each sense line including the first selected sense line as well as other sense lines that are not currently connected to the test capacitor Ctest purposefully via the switch matrix 448.

Thereafter the values measured at each sense line are analyzed to determine if a fault has been detected (step 812). This analysis may comprise simply comparing the electrical values at each sense line. The electrical values measured and compared may include, but are not limited to, voltage values, current values, and any other metric measurable from an electric signal. Where voltage is used as the value which is measured and compared, the voltage is representative of the capacitance between the drive line being driven and the sense line being measured. If only one sense line has a significantly different voltage measurement as compared to the other sense lines and the sense line having the significantly different voltage measurement corresponds to the sense line connected to the test capacitor Ctest, then it may be concluded that no fault has been detected. Similar analysis steps may be performed for current values.

The analysis of step 812 may alternatively, or additionally, comprise comparing the results obtained from testing the current drive/sense pair with results obtained from testing previous drive/sense pairs (either from testing the same touchscreen 104 or touch-sensitive panel 304, testing previous touchscreens 104 or touch-sensitive panels 304, or simulated testing where theoretical measurements have been obtained), assuming that the current drive/sense pair being tested is not the first drive/sense pair being tested.

If a fault is detected, then the process may continue by noting the location of the fault (step 816). Location information for the fault may be useful for comparing with the locations of faults in other touchscreens 104 or touch-sensitive panels 304. Specifically, if multiple touchscreens 104 or touch-sensitive panels 304 are having faults in similar locations, then the manufacturing process may comprise a systematic flaw that is repeatedly causing faults. If locations of faults can be determined it may be easier to identify which step in the manufacturing process is responsible for introducing the faults into the touchscreens 104 or touch-sensitive panels 304.

If no fault was detected or after the location of the fault has been noted, the process may continue by determining whether a different drive/sense pair is to be tested (step 820). This query may be answered negatively if every possible drive/sense pair has been tested, if a sufficient number of drive/sense pairs have been tested, and/or if a sufficient number of faults have been detected. If the query is answered affirmatively, the process proceeds with the selection and testing of a new drive/sense pair (step 824). Implementation of this step may be similar or identical to the implementation of step 808 except a different drive/sense pair is tested. Thereafter, the process returns to step 812.

If the query of step 820 is answered negatively, then the testing process is finalized (step 828). This particular process step may involve reporting the results of the testing process, whether positive or negative, reporting the noted locations of faults (if any), and/or reporting that the testing process is completed. The testing firmware 420 may then conclude its testing routine and the processor 404 may begin executing a different routine as required.

It should be noted that while the particular testing process described herein generically describes testing drive/sense pairs, other testing schemes can be implemented by the testing components 212 without departing from the scope of the present disclosure.

For example, it may be adequate to only test each drive line with respect to a single sense line (e.g., for a 4×4 array the test sequence may look like the following at each clock sequence—connect Ctest between first drive line 520a and first sense line 516a while driving first drive line 520a, then connect Ctest between second drive line 520b and first sense line 516a while driving second drive line 520b, then connect Ctest between third drive line 520c and first sense line 516a while driving third drive line 520c, and then connect Ctest between fourth drive line 520d and first sense line 516a while driving fourth drive line 520d).

As another example, it may be adequate to only test successive drive/sense line pairs (e.g., for a 4×4 array the test sequence may look like the following at each clock sequence—connect Ctest between first drive line 520a and first sense line 516a while driving first drive line 520a, then connect Ctest between second drive line 520b and second sense line 516b while driving second drive line 520b, then connect Ctest between third drive line 520c and third sense line 516c while driving third drive line 520c, and then connect Ctest between fourth drive line 520d and fourth sense line 516d while driving fourth drive line 520d).

As can be appreciated, other testing schemes may be employed without departing from the scope of the present disclosure. Specifically, multiple drive line switches 536 and/or multiple sense line switches 540 may be simultaneously closed to connect the test capacitor Ctest across multiple drive and/or sense lines. Alternatively, or in addition, multiple drive lines 520a-d may be simultaneously driven at a particular clock cycle. Alternatively, or in addition, only multiple drive lines or only multiple sense lines may be tested by connecting a plurality of drive lines, a plurality of sense lines, or a plurality of drive/sense line pairs across the test capacitor Ctest. Stated another way, it may also be possible to utilize embodiments of the present disclosure to test multiple lines on one axis to binary search if there are any irregularities versus a known reference point.

Pseudo code for a specific, but non-limiting example of a testing algorithm which may be used as part of the testing process described herein is shown below.

For drive lines 0 through num_drives;
  For sense lines 0 through num_senses;
    Connect test capacitor Ctest between selected drive and selected sense;
      For drive lines connected drive −1 through connected drive +1;
        Send drive clock on selected drive line;
          Capture data for connected sense −1 through connected sense +1;
          Examine array of drive/sense data. Common "large" numbers between two adjacent sense lines indicate a sense-to-sense line short; Common "large" numbers between two drive lines indicate a drive-to-drive line short;
Report test results;

One or more of the above-described testing processes can be implemented in the presence of additional drive/sense coupling, drive/drive coupling, sense/sense coupling, shunt capacitance, and ITO resistance. If the additional test capacitor Ctest is sufficiently large, the second order panel effects are generally negligible as compared to the effects of the test capacitor Ctest. Accordingly, the test capacitor Ctest can be used with a great amount of reliability and will generally not result in the false detection of faults.

Furthermore, although certain embodiments have been described herein as using a test capacitor Ctest for coupling one or more drive lines to one or more sense lines, embodiments of the present disclosure are not so limited. For example, the functionality of the test capacitor could be implemented by another other electrical coupling means suitable for connecting two or more lines (e.g., one or more drive lines to one or more sense lines, one drive line to another drive line, one sense line to another sense line, etc.). Accordingly, although the concept of coupling lines together via a test capacitor Ctest could be expanded to utilize any type of suitable electrical component or series of components which electrically co-ordinate the lines for testing. Examples of such suitable electrical components which may be used in addition to or in lieu of a test capacitor Ctest include, without limitation, one or more diodes, one or more resistors, one or more inductors, and so on.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A touchscreen controller, comprising:
one or more controlling components configured to control operations of a touchscreen or portions thereof by sensing a user input at the touchscreen and providing one or more outputs to a host processor indicative of the user input; and
one or more testing components configured to test the touchscreen or elements thereof for faults;
wherein the one or more testing components comprise a switch matrix configured to selectively couple and uncouple sense electronics to drive electronics;
wherein the one or more controlling components comprise instructions for detecting changes in measurements obtained from electric signals received at the sense electronics and converting the detected changes to user input data and wherein the one or more testing components comprises a test capacitor integrated within the controller;
wherein the switch matrix is further configured to selectively couple and uncouple the test capacitor to the sense electronics;
wherein the switch matrix is further configured to selectively couple and uncouple the test capacitor to the drive electronics; and
wherein the test capacitor is configured to be connected in parallel between a drive line in the drive electronics and a sense line in the sense electronics when corresponding drive line switches and sense line switches in the switch matrix are closed.

2. The controller of claim, wherein the test capacitor comprises a capacitance at least twice as large as a mutual capacitance created between a drive line in the drive electronics and a sense line in the sense electronics when the drive line is driven.

3. The controller of claim 1, wherein the one or more testing components comprises an electrical coupling mechanism and instructions configured to execute a touchscreen testing process by selectively coupling and uncoupling the electrical coupling mechanism to drive lines and sense lines passing through the touchscreen.

4. An Integrated Circuit comprising the controller of claim 1.

5. An apparatus configured to control a touchscreen by detecting user input at the touchscreen and generating one or more electrical signals indicative of the detected user input, the apparatus comprising:
testing components configured to test a touch-sensitive panel of the touchscreen for faults;
wherein the one or more testing components comprise a switch matrix configured to selectively couple and uncouple sense electronics to drive electronics;
wherein the testing components include the drive electronics electrically connected to drive lines in the touch-sensitive panel;

wherein the testing components further include the sense electronics electrically connected to sense lines in the touch-sensitive panel;

wherein the testing components further include a coupling mechanism connectable to the drive electronics and sense electronics via the switch matrix; and wherein the coupling mechanism is configured to be connected in parallel between a drive line in the drive electronics and a sense line in the sense electronics when corresponding drive line switches and sense line switches in the switch matrix are closed.

6. The apparatus of claim 5, wherein the switch matrix is configured to individually connect the coupling mechanism between each drive line in the touch-sensitive panel and each sense line in the touch-sensitive panel.

7. The apparatus of claim 5, wherein the testing components further comprise instructions configured to perform a testing process that controls whether the coupling mechanism is connected to a particular drive or sense line by controlling whether a switch in the switch matrix is open or closed.

8. The apparatus of claim 7, further comprising memory which stores the instructions as firmware.

9. A user device comprising the apparatus of claim 5.

10. A method for detecting faults in at least one of a touchscreen and a touch-sensitive panel, comprising:

retrieving instructions from a touchscreen controller to begin a testing process;

connecting test electronics incorporated within the touchscreen controller between at least one of a drive/sense line pair, drive/drive line pair, and sense/sense line pair and selectively coupling and uncoupling sense electronics to the drive electronics via a switch matrix to determine whether a fault exists in the at least one of a touchscreen and touch-sensitive panel;

measuring electrical signal outputs across the test electronics at the touchscreen controller; and based on the measured electrical signal outputs, determining whether the at least one of a touchscreen and touch-sensitive panel comprises a fault;

wherein the connecting step comprises connecting electrical coupling means in parallel across a first drive line and a first sense line.

11. The method of claim 10, wherein measuring electrical signal outputs comprises determining a first voltage or current reading at a first sense line, determining a second voltage or current reading at a second sense line, and comparing the first and second readings.

12. The method of claim 10, wherein the touchscreen comprises a capacitive-sense touchscreen and wherein the touch-sensitive panel comprises electrically conductive traces of Indium Tin Oxide (ITO) laid down on a substrate.

13. The method of claim 10, further comprising connecting the test electronics across at least one of (i) a plurality of drive lines, (ii) a plurality of sense lines, and (iii) a plurality of drive/sense line pairs.

14. The method of claim 10, further comprising sequentially testing different drive/sense line pairs by sequentially connecting the test electronics across different drive lines and sense lines.

* * * * *